United States Patent
Mehl et al.

(10) Patent No.: US 11,604,998 B2
(45) Date of Patent: Mar. 14, 2023

(54) UPGRADING A MACHINE LEARNING MODEL'S TRAINING STATE

(71) Applicant: Kaia Health Software GmbH, Munich (DE)

(72) Inventors: Konstantin Mehl, Munich (DE); Maximilian Strobel, Munich (DE)

(73) Assignee: Kaia Health Software GmbH, Munich (DE)

( * ) Notice: Subject to any disclaimer, the term of this patent is extended or adjusted under 35 U.S.C. 154(b) by 681 days.

(21) Appl. No.: 16/669,088

(22) Filed: Oct. 30, 2019

(65) Prior Publication Data

US 2021/0133580 A1    May 6, 2021

(51) Int. Cl.
| | |
|---|---|
| *G06N 3/08* | (2006.01) |
| *G06N 3/084* | (2023.01) |
| *G06F 16/901* | (2019.01) |
| *G06N 20/00* | (2019.01) |

(52) U.S. Cl.
CPC ........... *G06N 3/084* (2013.01); *G06F 16/901* (2019.01); *G06N 20/00* (2019.01)

(58) Field of Classification Search
CPC ...... G06N 3/084; G06N 3/0454; G96N 20/00; G96N 20/20
See application file for complete search history.

(56) References Cited

U.S. PATENT DOCUMENTS 10,373,332 B2 * 8/2019 Gu ..................... G06K 9/6271
2013/0166480 A1 * 6/2013 Popescu ................. G06N 20/00
706/12
2018/0268548 A1 * 9/2018 Lin ....................... G06N 3/0454

OTHER PUBLICATIONS

Charles et al., "Personalizing Human Video Pose Estimation", The IEEE Conference on Computer Vision and Pattern Recognition (CVPR), 2016, Total No. pp. 14.
Marcelino, "Transfer learning from pre-trained models", Towards Data Science, Oct. 2018, URL: https://towardsdatascience.com/transfer-learning-from-pre-trained-models-f2393f124751, Total No. pp. 22.
Zecha et al., "Kinematic Pose Rectification for Performance Analysis and Retrieval in Sports", The IEEE Conference on Computer Vision and Pattern Recognition (CVPR) Workshops, 2018, pp. 1904-1912.

* cited by examiner

*Primary Examiner* — Jamal Javaid
(74) *Attorney, Agent, or Firm* — Birch, Stewart, Kolasch & Birch, LLP

(57) ABSTRACT

A method for upgrading a training state of a machine learning model is described, the machine learning model being configured for supporting a model update. The method comprises predicting a set of target data elements based on the input data structure using the machine learning model, a target data element corresponding to a respective characteristic of the input data structure, and determining, for at least one of the predicted target data elements, whether or not a respective target data element is presumably erroneous. The method further comprises determining, for each presumably erroneous target data element detected in the previous step, an estimated corrected target data element, and performing, based on at least one estimated corrected target data element, a step of updating the training state of the machine learning model.

17 Claims, 5 Drawing Sheets

UPGRADING A MACHINE LEARNING MODEL'S TRAINING STATE

FIELD OF THE INVENTION

The invention relates to a method for upgrading a training state of a machine learning model, the machine learning model being configured for identifying predefined characteristics of an input data structure. The invention further relates to a system configured for upgrading a training state of a machine learning model. In addition, the invention relates to a method for upgrading a training state of a neural network, the neural network being configured for identifying landmarks in an image data structure or in a sequence of image data structures. The invention further relates to a system configured for upgrading a training state of a neural network.

BACKGROUND OF THE INVENTION

The article "Transfer learning from pre-trained models" by P. Marcelino, which can be retrieved at https://towardsdatascience.com/transfer-learning-from-pre-trained-models-f2393f124751 describes how to use transfer learning to solve image classification problems. The article shows how to implement a transfer learning solution for image classification problems. For repurposing a pre-trained model for a specific need, it is described to fine-tune a model according to one of the following strategies: training the entire model, training some layers and leave the others frozen, or freezing the convolutional base.

The Article "Kinematic Pose Rectification for Performance Analysis and Retrieval in Sports" by Dan Zecha et al can be retrieved at http://openaccess.thecvf.com/content_cvpr_2018_workshops/papers/w34/Zecha_Kinematic_Pose_Rectification_CVPR_2018_paper.pdf. This article relates to automated extraction of kinematic parameters from athletes in video footage. In aquatic training scenarios, for instance, continuous pose estimation suffers from several orthogonal errors like switched joints prediction between the left and right sides of the body. In the article, different error modes are analysed and a rectification pipeline for improving the pose predictions using merely joint coordinates is presented.

The article "Personalizing Human Video Pose Estimation" by James Charles et al, which can be retrieved at https://arxiv.org/pdf/1511.06676.pdf, describes a personalized pose estimator that automatically adapts itself to the uniqueness of a person's appearance to improve pose estimation in long videos.

OBJECT OF THE INVENTION

The object of the invention is to provide a method and a system capable of identifying characteristics of an input data structure with improved accuracy.

SUMMARY OF THE INVENTION

According to the invention, a method for upgrading a training state of a machine learning model is provided, the machine learning model being configured for supporting a model update. The method comprises predicting a set of target data elements based on the input data structure using the machine learning model, a target data element corresponding to a respective characteristic of the input data structure, and determining, for at least one of the predicted target data elements, whether or not a respective target data element is presumably erroneous. The method further comprises determining, for each presumably erroneous target data element detected in the previous step, an estimated corrected target data element, and performing, based on at least one estimated corrected target data element, a step of updating the training state of the machine learning model.

In the method according to the present invention, a set of target data elements is predicted based on an input data structure, with the set of target data elements comprising at least one target data element. A target data element is an output of the machine learning model. A target data element may for example be a key point indicating a position of a landmark in an image data structure, a class that the input variables may be mapped to in case of a classification problem, an output value range in case of a regression problem, etc. For at least one of the predicted target data elements, it is determined which of the target data elements are presumably erroneous. With respect to a presumably erroneous target data element, the respective target data element presumably does not correctly identify the predefined characteristic in the input data structure. For example, at least one criterion may indicate that there is a certain probability that this target data element has not been predicted correctly. According to the method of the present invention, for each presumably erroneous target data element, a corresponding estimated corrected target data element is determined. For example, the estimated corrected target data element may be determined by applying interpolation techniques to at least some of the target data elements, or by applying at least one predefined rule, or by using a second machine learning model, etc.

In a further step, the at least one estimated corrected target data element is used as a basis for updating the machine learning model's training state. The machine learning model is configured for supporting a model update, a model update being an update of a machine learning model's training state. During a model update, a subset of the model's parameters is modified while the remaining parameters are maintained. In this regard, a model update does not require rewriting all the parameters of the model. For example, a majority of all parameters may be updated very slightly during a model update. A model update can for example be performed without having the original dataset available. In a machine learning model configured for supporting a model update, it is therefore possible to update the training state based on an additional data set.

The starting point for updating a machine learning model is a machine learning model having a certain training state. In a step of updating the machine learning model's training state, the machine learning model is further trained with an additional data set. According to the solution of the present invention, at least one estimated corrected target data element is used for updating the machine learning model's training state. The estimated corrected target data elements are specifically related to the shortcomings of the machine learning model's actual training state. For this reason, the estimated corrected target data elements are particularly suited for correcting and improving the machine learning model's actual training state. By using correction data that is closely related to the shortcomings of the machine learning model's actual training state, it is possible to specifically improve the training state in order to avoid such shortcomings in the future. As a result, the machine learning model's prediction performance is improved.

Further according to the invention, a system configured for upgrading a training state of a machine learning model is provided. The system comprises the machine learning model, the machine learning model being configured for supporting a model update. The machine learning model is further configured for predicting a set of target data elements based on the input data structure, a target data element corresponding to a respective characteristic of the input data structure. The system further comprises an erroneous result detecting unit configured for determining, for at least one of the predicted target data elements, whether or not a respective target data element is presumably erroneous. The system further comprises a correction unit configured for determining, for each presumably erroneous target data element, an estimated corrected target data element. The system further comprises a model update unit configured for receiving, as an input, at least one estimated corrected target data element and for updating the training state of the machine learning model based on the at least one estimated corrected target data element.

The system of the present invention comprises a model update unit configured for adjusting the training state of the machine learning model based on the at least one estimated corrected target data element. By updating the machine learning model based on the estimated corrected target data elements, the training state of the machine learning model is improved. The model update unit may be configured for operating in the background, in order to for example continuously update the machine learning model's training state.

Further according to the invention, a mobile device is provided, the mobile device comprising a system as described above. Preferably, the mobile device further comprises a camera configured for acquiring the sequence of image frames.

Yet further according to the invention, a computer program product is provided, the computer program product being adapted to cause, when executed by a mobile device or a computer comprising a processor and a memory, the mobile device or the computer to perform the above described method for upgrading a training state of a machine learning model.

According to the invention, a method for upgrading a training state of a neural network is provided, the neural network being configured for identifying landmarks in an image data structure or in a sequence of image data structures. The method comprises predicting a set of key points for a respective image data structure using the neural network, a key point indicating a respective position of a landmark in the image data structure, and determining, for at least one of the predicted key points, whether or not a respective key point is presumably erroneous. The method further comprises determining, for each presumably erroneous key point detected in the previous step, an estimated corrected key point, and performing, based on at least one estimated corrected key point, a step of fine-tuning the training state of the neural network.

According to this method, a neural network is used for identifying landmarks in an image data structure or in a sequence of image data structures. In this regard, image data is a numeric representation of an image, an image being an artefact that depicts visual perception. An image may for example be represented by an array of pixels. Image data may for example be 2D, 2.5D or 3D image data.

Further according to the invention, a system configured for upgrading a training state of a neural network is provided. The system comprises the neural network, the neural network being configured for identifying landmarks in an image data structure or in a sequence of image data structures. The neural network is configured for predicting a set of key points for a respective image data structure, a key point indicating a respective position of a landmark in the image data structure. The system further comprises an erroneous result detecting unit configured for determining, for at least one of the predicted key points, whether or not a respective key point is presumably erroneous. The system further comprises a correction unit configured for determining, for each presumably erroneous key point, an estimated corrected key point. The system further comprises a model update unit configured for receiving, as an input, at least one estimated corrected key point and for fine-tuning the training state of the neural network by performing a backpropagation method based on the at least one estimated corrected key point.

For fine-tuning the neural network's training state, the model update unit is configured for performing a backpropagation method based on the at least one estimated corrected key point. In a backpropagation method, parameters of at least one of the neural network's layers are adjusted in a way that a loss function describing the neural network's actual training state is minimised.

PREFERRED EMBODIMENTS OF THE INVENTION

Preferred features of the invention which may be applied alone or in combination are discussed below and in the dependent claims.

Method for Upgrading the Machine Learning Model's Training State

Preferably, the machine learning model is one of the following: a neural network, a Manifold Method, a Distribution Method, an Iterative Method, a Kernel Method, an Online Convex Optimization, a Perceptron, a Forest-based Method.

Preferably, the input data structure is a temporal sequence of elementary data structures, with each elementary data structure corresponding to a certain point of time.

Preferably, the machine learning model is initially in a generic training state. The generic training state serves as a starting point for updating the machine learning model's training state. By updating the training state, a personalised and improved training state is accomplished, which allows for an improved prediction performance. In this regard, personalising shall mean adapting the machine learning model's training state to the particular characteristics of a use case, e.g. in case of pose estimation, adapting the training state to the body characteristics of a person performing an exercise.

Preferably, for determining whether or not a respective target data element is presumably erroneous, a predetermined criterion is evaluated, the criterion being configured for detecting target data elements that presumably do not indicate the respective characteristic correctly.

According to a preferred embodiment, determining whether or not a target data element is presumably erroneous is based on hand-engineered criteria. Such hand-engineered criteria may be set up for detecting typical errors. According to yet another embodiment, determining whether or not a target data element is presumably erroneous is based on criteria determined using deep learning techniques. A deep learning technique may yield criteria capable of distinguishing between reliable target data elements and presumably erroneous target data elements. For example, a generative adversarial network (GAN) may be used for determining whether or not a target data element is presumably eroneous. A generative adversarial network (GAN) consists of two parts, a generator and a discriminator. The generator is a neural network that generates samples. The task of the generator is to produce samples that are closest to a given real target distribution. The discriminator is a second neural network. The task of the discriminator is to distinguish the original samples of the real target distribution from the samples generated by the generator.

The two neural networks, the generator and the discriminator, train each other in a mutual training process. The generator tries to produce fake samples that are as close as possible to the original training data set. In turn, the discriminator tries to distinguish these fake samples produced by the generator from the samples of the original training data set. Over time, during the training process, both networks get better at their respective tasks.

In embodiments of the present invention, during the mutual training process, the generator may for example produce target data elements that are as close as possible to the original data set, and the discriminator may for example try to distinguish these target data elements produced by the generator from the data of the original training data set. After the training has been performed, the discriminator can be used to determine whether a new target data element is in the distribution or close to the distribution of the original data set or not. In case the discriminator determines that a new target data element is not close to the distribution of the original data set, the new target data element is identified as an outlier and the new target data element is identified as being presumably erroneous.

Identifying presumably erroneous Target Data Elements based on a Model Distribution According to a preferred embodiment, the method comprises evaluating, for input data of the input data structure or for at least one target data element predicted based on the input data structure, a position of the input data or of the at least one target data element relative to a predetermined model distribution of the input data or of the set or a subset of target data elements or of parameters derived therefrom, and determining, based on the evaluation, whether or not one or more of the predicted target data elements are presumably erroneous. Thus, presumably erroneous target data elements may for example be identified based on a model distribution of the input data or based on a model distribution of output data. Preferably, the method comprises evaluating, for input data of the input data structure, a position of the input data relative to a predetermined model distribution of the input data, and determining, based on the evaluation of the input data, whether or not one or more of the target data elements predicted based on the input data structure are presumably erroneous. According to an alternatively preferred embodiment, the method comprises evaluating, for at least one target data element predicted based on the input data structure, a position of the at least one target data element in relation to a predetermined model distribution of the set of target data elements or of a subset of target data elements or of parameters derived from target data elements, and determining, based on the evaluation, whether or not one or more of the predicted target data elements are presumably erroneous. A model distribution of the set of target data elements or of a subset thereof or of parameters derived from target data elements indicates a ground truth. The model distribution may for example be obtained from one or more training data sets or from collected empirical values. The model distribution may for example represent an ideal distribution or an expected distribution of the target data elements. By evaluating a respective target data element's position relative to the model distribution, it can be determined whether or not the respective target data element is an outlier.

In a preferred embodiment, the method comprises determining, for a respective data element of the input data or for a respective target data element predicted based on the input data structure, a distance measure indicating a distance of the respective data element relative to a predetermined model distribution of the input data or of the set or a subset of target data elements or of parameters derived from target data elements, and determining, based on the distance measure, whether or not one or more of the predicted target data elements are presumably erroneous. In a preferred embodiment, the method comprises determining, for a respective target data element, a distance measure indicating a distance of the respective target data element relative to a predetermined model distribution of the set of target data elements or of a subset of target data elements or of parameters derived from target data elements, and determining, based on the distance measure, whether or not the respective target data element is presumably erroneous.

In a preferred embodiment, the predetermined model distribution is represented as a manifold. For example, the model distribution may be represented as a manifold in a high-dimensional space. Further preferably, the predetermined model distribution is generated based on at least one training data set.

Identifying presumably erroneous Target Data Elements based on Time Propagation According to a preferred embodiment of the invention, the input data structure is a temporal sequence of elementary data structures, with each elementary data structure corresponding to a certain point of time, wherein determining whether or not a respective target data element corresponding to a respective characteristic in an elementary data structure is presumably erroneous is based on an evaluation of a time progression of target data elements that correspond to the same characteristic in the sequence of elementary data structures. In case the target data element's position does not fit into the time progression of target data elements related to the same characteristic, the respective target data element is presumably erroneous.

Preferably, the method comprises evaluating a position of a respective target data element corresponding to a respective characteristic relative to a curve indicating the time course of target data elements that correspond to the same characteristic in the temporal sequence of elementary data structures, and determining, based on this evaluation, whether or not the respective target data element is presumable erroneous. The time progression of the target data elements that correspond to a characteristic may for example be represented as a smooth curve. Preferably, the curve indicating the time course of target data elements that correspond to a certain characteristic in the sequence of elementary data structures is determined using at least one of the following: exponential smoothing, moving averages, median filtering, Calman filtering, iteratively reweighted least squares regression, Savitzky-Golay filtering, a filtering technique, a trend decomposition method, Seasonal and Trend Decomposition using Loess. A trend decomposition method can for example be used for determining an underlying trend of the key points' time progression.

According to a further preferred embodiment, the method comprises determining a distance measure, said distance measure indicating a distance between a respective target data element corresponding to a respective characteristic and a curve indicating the time course of target data elements that correspond to the same characteristic in the sequence of elementary data structures, and determining, based on the distance measure, whether or not the respective target data element is presumably erroneous. In case of a large distance between the respective target data element and said curve, the respective target data element is presumably erroneous.

According to a preferred embodiment, the input data structure is a sequence of image data structures, wherein the target data elements are key points predicted for image data structures, a key point indicating a respective position of a landmark in an image data structure, and wherein an optical flow of at least one key point in the sequence of image data structures is determined. The optical flow is obtained by projecting a vector field of velocities of the at least one key point onto an image plane. Preferably, the method comprises determining whether or not a respective key point is presumably erroneous by evaluating the position or velocity or motion of the respective key point in relation to the optical flow. For example, it can be determined whether or not a particular key point fits into the motion pattern described by the optical flow.

Identifying presumably erroneous Target Data Elements based on Domain-Specific Rules According to a preferred embodiment, it is determined whether or not a target data element is presumably erroneous by evaluating at least one predefined rule. These rules may for example be configured for determining if a certain target data element is plausible in its respective context, in order to identify outliers. Preferably, at least one predefined rule may be configured for evaluating geometric constraints or positional constraints of at least one target data element. For example, the input data structure may be an image data structure or a sequence of image data structures and at least one predefined rule may be configured for evaluating at least one of distance constraints for at least two target data elements and angular constraints for at least three target data elements. For example, in case a distance between a body key point corresponding to the elbow and a body key point representing the shoulder is too short, at least one of the first body key point and the second body key point is presumably erroneous. Furthermore, a body joint generally allows only for a restricted movement. In case a set of body key points describes an angle that is not in agreement with anatomic properties, at least one of the body key points is presumably erroneous. Further preferably, at least one predefined rule is configured for evaluating limits on velocity or acceleration of a key point.

According to a preferred embodiment, the input data structure is a sequence of image data structures, wherein the target data elements are key points predicted for image data structures, a key point indicating a respective position of a landmark in an image data structure, wherein at least one predefined rule is configured for detecting that due to wrong matching, key points corresponding to a particular landmark are alternatingly attributed to different landmarks in the sequence of image data structures. In a preferred embodiment, a neural network may be configured for predicting a set of body key points of a human body for each image data structure in a sequence of image data structures, wherein at least one predefined rule is configured for detecting that due to wrong matching, body key points corresponding to a particular body characteristic are alternatingly attributed to different body parts in the sequence of image data structures. For example, a body key point related to the knee may for example be alternatingly attributed to the left leg and to the right leg, which may give rise to jittering. In order to prevent jittering, a specific rule configured for detecting and correcting this kind of error may be set up.

Identifying presumably erroneous Target Data Elements using a second Machine Learning Model According to a preferred embodiment, a second machine learning model is used for determining whether or not a target data element is presumably erroneous. For example, the machine learning model may be trained to identify specific types of errors like for example erroneously assigned target data elements and jittering.

Identifying presumably erroneous Target Data Elements by evaluating a Confidence Level According to a further preferred embodiment, for each target data element predicted based on the input data structure, a corresponding confidence level is output by the machine learning model. Preferably, the method further comprises comparing the confidence level of a respective target data element with a predetermined threshold, wherein in case the confidence level is below the predefined threshold, the target data element is presumably erroneous. Preferably, the input data structure is a sequence of image data structures, wherein the target data elements are key points predicted for image data structures, a key point indicating a respective position of a landmark in an image data structure, wherein the neural network is configured for outputting a feature map for each predefined characteristic to be predicted, with the feature map indicating a position of a key point in an image data structure and a corresponding confidence level. In this regard, the confidence level indicated in the at least one feature map can be used for identifying those key points which are presumably erroneous.

Determining estimated corrected Target Data Elements based on a Model Distribution According to a preferred embodiment, the method comprises determining, for each presumably erroneous target data element, an estimated corrected target data element based on a model distribution of the input data or of the set or a subset of target data elements or of parameters derived therefrom. For example, the point of the model distribution that is closest to the presumably erroneous target data element may be determined. This closest point in the model distribution may then be used as an estimated corrected target data element.

Determining estimated corrected Target Data Elements based on Time Propagation According to a preferred embodiment, the method comprises determining, for each presumably erroneous target data element, an estimated corrected target data element by applying interpolation techniques to at least some of the target data elements predicted based on the input data structure. Interpolation techniques allow for deriving a position of an estimated corrected target data element from the positions of other target data elements. Thus, each presumably erroneous target data element can be replaced by an estimated corrected target data element.

Preferably, the input data structure is a temporal sequence of elementary data structures, with each elementary data structure corresponding to a certain point of time, wherein the method comprises determining, for a presumably erroneous target data element corresponding to a respective characteristic in an elementary data structure, a time progression of target data elements corresponding to the same characteristic from the sequence of elementary data structures and deriving an estimated corrected target data element from the time progression of the target data elements. For example, the estimated corrected target data element is determined such that it fits into the time progression of target data elements that correspond to the same characteristic in the sequence of elementary data structures.

Preferably, the time progression of target data elements corresponding to a particular characteristic is determined using one of the following: exponential smoothing, moving averages, median filtering, Calman filtering, iteratively reweighted least squares regression, Savitzky-Golay filtering, a filtering technique, a trend decomposition method, Seasonal and Trend Decomposition using Loess.

Preferably, the position of the estimated corrected target data element that corresponds to the particular characteristic is determined using interpolation techniques. According to a preferred embodiment, with regard to a presumably erroneous target data element that corresponds to a particular characteristic in an elementary data structure, interpolation techniques are applied to target data elements corresponding to the same characteristic in a number of elementary data structures preceding the particular elementary data structure and/or in a number of elementary data structures following the particular elementary data structure.

Preferably, the interpolation techniques are applied to target data elements of at least one elementary data structure preceding the particular elementary data structure, further preferably to target data elements of at least two elementary data structures, further preferably to target data elements of at least five elementary data structures preceding the particular elementary data structure. Further preferably, the interpolation techniques are applied to target data elements of at most ten elementary data structures preceding the particular elementary data structure. Preferably, the interpolation techniques are applied to target data elements of at least one elementary data structure following the particular elementary data structure, further preferably to target data elements of at least two elementary data structures, further preferably to target data elements of at least five elementary data structures following the particular elementary data structure. Further preferably, the interpolation techniques are applied to target data elements of at most ten elementary data structures following the particular elementary data structure.

According to a preferred embodiment, with regard to a presumably erroneous target data element corresponding to a respective characteristic in a particular elementary data structure, interpolation techniques are applied to target data elements corresponding to the same characteristic in elementary data structures in a time interval preceding the particular elementary data structure and/or in elementary data structures in a time interval following the particular elementary data structure.

Preferably, the interpolation techniques are applied to target data elements in a time interval of more than 0.1 sec preceding the particular elementary data structure. Preferably, the interpolation techniques are applied to target data elements in a time interval of less than 2 sec preceding the particular elementary data structure. Preferably, the interpolation techniques are applied to target data elements in a time interval of more than 0.1 sec following the particular elementary data structure. Preferably, the interpolation techniques are applied to target data elements in a time interval of less than 2 sec following the particular elementary data structure.

Determining estimated corrected Target Data Elements based on Domain-Specific Rules According to a preferred embodiment, the method comprises determining, for each presumably erroneous target data element, an estimated corrected target data element by applying at least one predefined rule for determining the estimated corrected target data element.

Preferably, the input data structure may be an image data structure or a sequence of image data structures and the at least one rule is configured for determining the estimated corrected target data element based on predefined geometric properties. For example, in case of body key points indicating a body posture, the at least one rule may be based on anatomic proportions.

According to a preferred embodiment, the input data structure is a sequence of image data structures, wherein the target data elements are key points predicted for image data structures, a key point indicating a respective position of a landmark in an image data structure, wherein in case that due to wrong matching, key points corresponding to a particular landmark are alternatingly attributed to different landmarks in the sequence of image data structures, at least one predefined rule is applied, said at least one rule being configured to correct the attribution of key points to landmarks.

Preferably, a neural network is configured for predicting a set of body key points of a human body for each image data structure in a sequence of image data structures, wherein in case that due to wrong matching, body key points corresponding to a particular body characteristic are alternatingly attributed to different body parts in the sequence of image data structures, at least one predefined rule is applied, said at least one rule being configured to correct the attribution of body key points to body characteristics. For example, a body key point related to the knee may for example be alternatingly attributed to the left leg and to the right leg, which may give rise to jittering. In order to prevent jittering, a specific rule configured for detecting and correcting this kind of error may be set up.

Determining estimated corrected Target Data Elements using a second Machine Learning Model According to preferred embodiment, for a presumably erroneous target data element, an estimated corrected target data element is determined by using a second machine learning model, wherein the second machine learning model is configured for identifying predefined characteristics of the input data structure. Preferably, the second machine learning model is more powerful than the machine learning model. Therefore, the second machine learning model may be capable of providing more accurate results. Feature extraction using the second machine learning model may be computationally expensive, and accordingly, the second machine learning model may only be used for performing a model update in the background. According to yet another example, the second machine learning model may be configured for detecting and correcting specific types of errors like for example erroneously assigned target data elements. According to a preferred embodiment, both the machine learning model and the second machine learning model are implemented on a mobile device.

Updating of the Machine Learning Model's Training State

Preferably, at least one estimated corrected target data element is fed as input to a model update unit. Preferably, the at least one estimated corrected target data element serves as an estimated ground truth in a subsequent step of updating the training state of the machine learning model. In particular, the estimated corrected target data elements are treated as valid indications of the respective characteristics of the input data structure when performing the step of updating the training state of the machine learning model.

Preferably, at least some of the steps of predicting target data elements based on the sequence of elementary data structures and the steps of identifying erroneous target data elements, determining estimated corrected target data elements and updating the machine learning model's training state are performed in parallel. According to a preferred embodiment, while target data elements are predicted based on the sequence of elementary data structures, at least one of the steps of identifying erroneous target data elements, determining estimated corrected target data elements and updating the machine learning model's training state is performed simultaneously. Preferably, the steps of identifying erroneous target data elements, determining estimated corrected target data elements and updating the machine learning model's training state are performed in the background during the machine learning model's regular operation. In this embodiment, the machine learning model's training state may for example be continuously updated and improved in the background. Due to this training in the background, the machine learning model's prediction performance is improved.

According to a preferred embodiment, the input data structure is a temporal sequence of elementary data structures, with each elementary data structure corresponding to a certain point of time, wherein the target data elements are predicted by the machine learning model based on the elementary data structures in real time. In order to fulfil a real time constraint, the machine learning model is capable of predicting the target data elements within a predefined response time. As a consequence, data acquisition, prediction of the target data element and the model update can be performed in parallel. According to a preferred embodiment, the input data structure is a temporal sequence of elementary data structures, with each elementary data structure corresponding to a certain point of time, and the at least one estimated corrected target data element is output with a predetermined time delay relative to the target data elements predicted based on the sequence of elementary data structures by the machine learning model. Because of the time delay, both elementary data structures preceding a certain elementary data structure and elementary data structures following a certain elementary data structure can be considered when determining the estimated corrected target data element. For example, an interpolation may be performed between target data elements predicted based on elementary data structures preceding a certain elementary data structure and target data elements predicted based on elementary data structures following a certain elementary data structure. By introducing the predetermined time delay between the output of the predicted target data elements and the output of the estimated corrected target data element, predicted target data elements that lie in the future of the estimated corrected target data element can be considered when determining the estimated corrected target data element. Preferably, the input data structure is a sequence of image data structures and the predetermined time delay is a time interval with a length in the range of 1 to 10 image frames.

Preferably, the method is performed on a mobile device. For example, both the steps of predicting target data elements based on a sequence of elementary data structures and of updating the machine learning model's training state based on at least one estimated corrected target data element may be performed on the mobile device. Accordingly, the machine learning model's regular operation of identifying predefined characteristics of the input data and the model update are both performed on the mobile device. By continuously performing the model update on the mobile device during the machine learning model's regular operation, the training state of the machine learning model on the mobile device can be improved.

According to a preferred embodiment, the machine learning model is a neural network. Preferably, the method comprises performing a backpropagation method based on the at least one estimated corrected target data element.

Preferably, at least one estimated corrected target data element is fed as input to a model update unit configured for performing a backpropagation method. In a preferred embodiment, the method comprises performing a backpropagation method based on the at least one estimated corrected target data element and the original image frames. According to the backpropagation method, parameters of at least one of the neural network's layers are adjusted in a way that a loss function is minimised. Preferably, a stochastic gradient descent is performed in order to fine tune the neural network's training state. Preferably, the backpropagation method comprises adjusting parameters of at least one layer of the neural network. Further preferably, the backpropagation method comprises adjusting parameters of at least one convolutional layer's kernel.

In a preferred embodiment, the neural network comprises a plurality of layers, wherein layers in a first subset of the neural network's layers are treated as frozen layers and layers in a second subset of the neural network's layers are treated as trainable layers, wherein the parameters of the frozen layers are kept constant, and wherein the parameters of the trainable layers are adjusted when performing the process of fine-tuning. Thus, the training state of the frozen layers is maintained during the step of fine-tuning, and only the parameters of the trainable layers are adjusted. By treating the layers in the first subset as frozen layers, it is made sure that during the step of fine-tuning, only a slight adjustment of the neural network's training state is effected.

Preferably, the input data structure is an image data structure or a sequence of image data structures. Image data is a numeric representation of an image, in particular of a 2D, 2.5D or 3D image, an image being an artefact that depicts visual perception. An image may for example be represented by an array of pixels. Image data may for example be acquired using a 2D, 2.5D or 3D camera, for example a built-in camera of a mobile device. Preferably, the target data elements are key points predicted for an image data structure, a key point indicating a respective position of a landmark in the image data structure.

Preferably, the machine learning model is a neural network and the input data structure is an image data structure or a sequence of image data structures, wherein the neural network is configured for identifying landmarks in the image data structure or in the sequence of image data structures, and wherein the method comprises a step of predicting a set of key points for a respective image data structure using the neural network, a key point indicating a respective position of a landmark in the image data structure.

Preferably, the image data structure or the sequence of image data structures is an image frame or a sequence of image frames. According to a preferred embodiment, the image data structure comprises extended image data. Extended image data comprises pixel data and additional information about the image like for example information about occluded regions in the image, histogram information regarding color values and/or brightness values, average color and/or brightness values, information about objects in the background, etc.

According to a preferred embodiment, the neural network is configured for estimating poses of a human body. Preferably, the neural network is configured for estimating poses of a person performing physical exercising. For example, the neural network may be configured for predicting a set of body key points of a human body for each image data structure in a sequence of image data structures. Preferably, the neural network is configured for predicting a set of body key points of a human body for each image data structure in a sequence of image data structures, the set of body key points indicating a pose of the human body.

In a preferred embodiment, the key points are predicted for the image data structures in real time. In order to fulfil a real time constraint, the prediction of key points for the image data structures has to be carried out within a pre-defined response time. For example, image data structures may be acquired at a rate in the range of 8 frames per second to 50 frames per second. In case the computation required for predicting key points for an image data structure can be completed in the time interval between consecutive image data structures, the real time constraint is fulfilled. In this case, image data acquisition, evaluation of the key points and the model update can be performed in parallel.

According to an alternatively preferred embodiment, the machine learning model is a random forest. Preferably, the machine learning model is a random forest and the at least one target data element is classification data and the at least one estimated corrected target data element is corrected classification data. Preferably, the step of updating the training state of the random forest comprises replacing at least one decision tree of the random forest by at least one new decision tree or adding at least one new decision tree to the random forest, the at least one new decision tree being only trained on the corrected classification data.

System for Upgrading the Training State of a Machine Learning Model

According to a preferred embodiment, the erroneous result detecting unit is configured for determining, for at least one of the target data elements predicted by the machine learning model, which ones of said target data elements are presumably erroneous by evaluating a predetermined criterion, the criterion being configured for detecting target data elements that presumably do not indicate the respective characteristic of the input data structure correctly.

Preferably, the correction unit is configured for generating, for each presumably erroneous target data element, an estimated corrected target data element by applying interpolation techniques to at least some of the target data elements predicted based on the input data structure, or by applying at least one predefined rule for determining the estimated corrected target data element, or by using a second machine learning model for determining the estimated corrected target data element. Preferably, the model update unit is configured for receiving at least one estimated corrected target data element from the correction unit. According to a preferred embodiment, the correction unit and the erroneous result detecting unit are implemented as a combined unit.

According to a preferred embodiment, the machine learning model is implemented on a mobile device. In this embodiment, the step of predicting target data elements based on the input data structure is performed on the mobile device. Further preferably, the machine learning model, the erroneous result detecting unit, the correction unit and the model update unit are implemented on a mobile device. In this embodiment, both the steps of predicting target data elements based on the input data structure and of updating the machine learning model's training state are performed on the mobile device. In this way, it is possible to continuously update the machine learning model's training state on the mobile device during the model's regular operation. According to an alternatively preferred embodiment, the components for the model update, in particular the erroneous result detecting unit, the correction unit and the model update unit, may be installed on a remote computer. In this case, the step of updating the machine learning model's training state may be performed on the remote computer.

According to a preferred embodiment, the machine learning model is a neural network. Preferably, the model update unit is configured for receiving at least one estimated corrected target data element from the correction unit. Further preferably, the model update unit is configured for performing a backpropagation method based on at least one estimated corrected target data element. In a preferred embodiment, at least one estimated corrected target data element serves as an estimated ground truth for the model update. For example, the model update unit may be configured for performing a stochastic gradient descent in order to update the neural network's training state. Preferably, the model update unit is configured for adjusting parameters of at least one layer of the neural network. Further preferably, the model update unit is configured for adjusting parameters of at least one convolutional layer's kernel.

According to a preferred embodiment, the neural network comprises a plurality of layers, wherein the model update unit is configured for treating the layers in a first subset of the neural network's layers as frozen layers and for treating the layers in a second subset of the neural network's layers as trainable layers, wherein the parameters of the frozen layers are kept constant and wherein the parameters of the trainable layers are adjusted when performing the process of fine-tuning.

Preferably, the input data structure is an image data structure or a sequence of image data structures. Preferably, the target data elements are key points predicted for an image data structure, a key point indicating a respective position of a landmark in the image data structure.

Preferably, the machine learning model is a neural network and the input data structure is an image data structure or a sequence of image data structures, wherein the neural network is configured for identifying landmarks in the image data structure or in the sequence of image data structures, and wherein the method comprises a step of predicting a set of key points for a respective image data structure using the neural network, a key point indicating a respective position of a landmark in the image data structure. Preferably, the image data structure or the sequence of image data structures is an image frame or a sequence of image frames. According to a preferred embodiment, the image data structure comprises extended image data.

Preferably, the system comprises a camera configured for acquiring the sequence of image data structures. Further preferably, the camera is a built-in camera of a mobile device. In a preferred embodiment, the camera is one of: a 2D camera, a 2.5D camera, a 3D camera. The key points predicted for each image data structure may for example be 2D points, wherein the sequence of image data structures is acquired using a 2D camera. In an alternatively preferred embodiment, the key points predicted for each image data structure are 3D points, wherein the sequence of image data structures is acquired using a 2D camera or a 2.5D camera. The additional depth information of the key points can be derived from 2D or 2.5D image data structures acquired using a 2D or 2.5D camera, because using the techniques of machine learning, it is possible to derive additional depth information from a 2D image data structure or from a sequence of 2D image data structures. Machine learning allows for predicting depth information on the basis of a single image; it is not necessary to analyse multiple images or a sequence of images. Machine learning allows for estimating additional depth information from 2D image data structures. For example, the neural network may for example comprise an additional depth regression module. In an alternatively preferred embodiment, the key points predicted for each image data structure are 2.5D points or 3D points, wherein the sequence of image data structures is acquired using a 2.5D camera or a 3D camera. In this case, the 2.5D camera or 3D camera provides the additional depth information.

There exist a variety of different implementations for a neural network configured for predicting predefined characteristics based on a sequence of image data structures, which may e.g. comprise a variety of different functional layers. In a preferred embodiment, the neural network is a convolutional neural network. A convolutional neural network is well-suited for predicting predefined characteristics from a sequence of image data structures. Preferably, the neural network comprises at least one convolutional layer.

Further preferably, the neural network comprises at least one of the following: at least one convolutional layer; at least one pooling layer; at least one nonlinear layer; at least one fully connected layer; at least one classifier. Preferably, the classifier is realised as a fully connected layer. In a preferred embodiment, the neural network comprises at least one classifier adapted for predicting at least one key point per image data structure, a key point indicating a position of a respective characteristic in the image data structure.

According to a preferred embodiment, the neural network is configured for outputting at least one feature map per image data structure. Further preferably, the neural network is configured for generating a feature map for each key point to be predicted. Preferably, a feature map indicates a probability distribution for a key point's position in a respective image data structure. Preferably, a feature map indicates a position of a key point in an image data structure. According to yet another preferred embodiment, a feature map indicates a position of a key point in an image data structure and a corresponding confidence level of the position.

BRIEF DESCRIPTION OF THE DRAWING

The invention is illustrated in greater detail with the aid of schematic drawings. It shows schematically.

DETAILED DESCRIPTION OF EMBODIMENTS OF THE INVENTION

Figure 1:
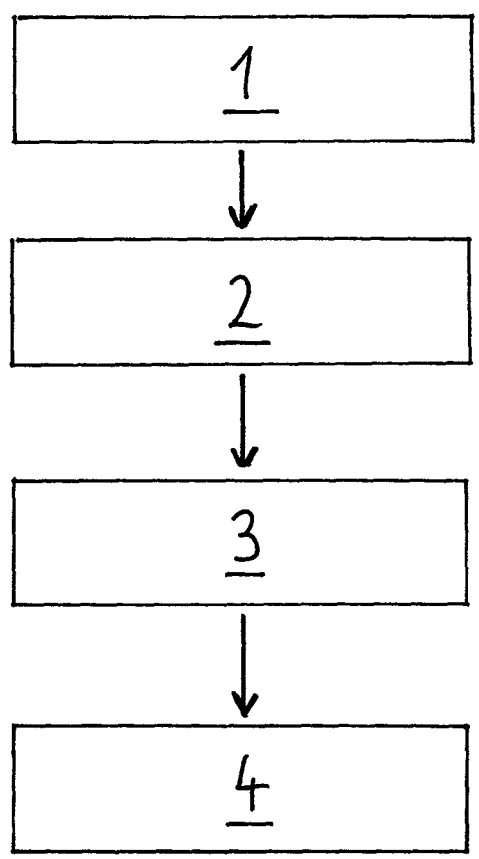
FIG. 1 shows a flowchart of the method for updating a training state of a machine learning model according to embodiments of the present invention.

In the following description of preferred embodiments of the present invention, identical reference numerals denote identical or comparable components.

FIG. 1 shows a method for upgrading a training state of a machine learning model. The machine learning model may for example be configured for identifying predefined characteristics of an input data structure. In particular, the machine learning model may be configured for predicting a set of target data elements based on the input data structure, a target data element corresponding to a respective characteristic of the input data structure. The machine learning model is configured for supporting a model update.

In the flowchart of FIG. 1, a first step 1 relates to predicting a set of target data elements based on an input data structure using a machine learning model. In a second step 2, it is determined, for at least one of the target data elements, whether or not the respective target data element is presumably erroneous. For example, a predefined criterion may be applied for determining whether or not a respective target data element is presumably erroneous. As a result of step 2, those target data elements that are presumably erroneous are identified. In the next step 3, for each of the presumably erroneous target data elements identified in step 2, an estimated corrected target data element is determined. The estimated corrected target data element may for example be determined by applying interpolation techniques to target data elements in the input data structure, by applying predefined rules, or by applying a second machine learning model. As a result, for each outlier identified in step 2, a corresponding estimated corrected target data element is determined. In step 4, updating of the machine learning model's training state is performed based on the at least one estimated corrected target data element determined in step 3. Updating the training state of the machine learning model relates to an adjustment of a machine learning model's actual training state. In a step of updating the machine learning model's training state, a machine learning model that has been trained with a first data set A is further trained with a second data set B. In step 4, the at least one estimated corrected target data element determined in step 3 is used as an estimated ground truth for performing a step of updating the machine learning model's training state. As a result of step 4, a machine learning model with an improved training state is obtained. The steps 2, 3 and 4 can be performed in the background, in order to continuously adjust the machine learning model's training state. For example, the steps 2, 3 and 4 can be performed in the background during the machine learning model's regular operation.

There are actually quite a number of machine learning methods that allow for a model update without rewriting all the parameters of the model. In this regard, the model update can for example be performed without having the original dataset available. The machine learning model may for example be one of a Manifold Method, a Distribution Method, an Iterative Method, a Kernel method, an Online Convex Optimisation, a Perceptron, a Forest-based Method. These machine learning models support online learning. Therefore, it is possible to update the training state based on at least one estimated corrected target data element.

In particular, the machine learning model may for example be a Manifold Method like for example k Nearest Neighbours (KNNeighbours), Radius Neighbours, Nearest Centroid, Kernel Density, a Distribution Method like for example Gaussian Naïve Bayes (GaussianNB), Multinomial Naïve Bayes (MultinomialNB), Bernoulli Naïve Bayes (BernoulliNB) or an Iterative Method like for example Batch Least Squares, Recursive Least Squares, Stochastic Gradient Descent, Gradient Boosting. Furthermore, the machine learning model may for example be a Kernel Method like for example Gaussian Process, Support Vector Machine (SVM), Spectral Clustering or an Online Convex Optimisation like for example Follow-The-Leader (FTL) or Follow-The-Regularized-Leader (FTRL). The machine learning model may for example be a Perceptron like for example a Linear/Nonlinear Neural Network or a Forest-based Method like for example Random Forest.

First Example: Model Update of a Random Forest

The machine learning model may for example be a forest-based method, for example a random forest comprising at least one decision tree. A random forest comprises several uncorrelated decision trees, the decision trees being constructed at training time. For a classification, each tree in that forest may make a decision and the class with the most votes decides the final classification.

Decision trees are a method for the automatic classification of data objects and thus for solving decision problems. A decision tree always consists of a root node, any number of inner nodes, and at least two leaves. Each node represents a logical rule and each leaf represents an answer to the decision problem. Decision tree learning uses a decision tree (as a predictive model) to go from observations about an item (represented in the branches) to conclusions about the item's target value (represented in the leaves). Tree models where the target variable can take a discrete set of values are called classification trees.

Decision trees can be automatically induced by machine learning techniques from one or more training data sets, for example from collected empirical values. The decision trees are usually induced recursively using the top-down principle. For this it is of decisive importance that a suitable data set is available, for example class-labelled training tuples. This means that the classification of the target attribute must be known for each object of the training data set. For each induction step, the system searches for the attribute that best classifies the training data in this step with regard to the target attribute. There are several competing algorithms like for example entropy measures, Gini indexes etc. to determine the best classification. The determined attribute is used to divide the data. The procedure is applied recursively to the resulting subsets until each subset contains only objects with a classification. The result is a decision tree that describes the experiential knowledge of the training data record in formal rules.

A random forest may for example be configured for classifying input data and for determining class labels for the input data. For these class labels, it is determined in a first step which of these class labels are presumably erroneous.

As a first option, for identifying class labels that are presumably erroneous, the input data of the random forest model may be compared to a model distribution of the input data, for example to a distribution of input data obtained from one or more training data sets. In case it is determined that the respective input data is an outlier in relation to the input data distribution, the random forest model has not seen this input before and accordingly, it is likely that the random forest model is not capable of correctly determining the right class label for this input data. Therefore, in case an outlier is detected, it is assumed that the class label provided by the random forest model is presumably erroneous.

According to a second option, in case the input data to be classified is a temporal sequence of elementary data structures, the random forest will yield a class label for each elementary data structure. In this case, outliers may be detected by evaluating the temporal sequence of these class labels. For example, it may be found that the respective sequence of class labels is not plausible or even impermissible. In this case, one or more of the class labels are presumably erroneous.

According to a third option, labels that are presumably erroneous may be identified based on domain specific rules. According to this option, outliers are identified by applying predefined rules, said rules being configured for detecting class labels that are not plausible or even impossible in the respective context.

According to a fourth option, a second machine learning model may be used for identifying class labels that are presumably erroneous. For example, a neural network may be used for identifying class labels provided by the random forest which are presumably erroneous. For example, the second machine learning model may be trained to identify those class labels which are not plausible or even impossible in the respective context.

As a fifth option, for each class label, a corresponding confidence level may be determined, and outliers may be detected based on these confidence levels. For instance, in case the confidence level of a class label is below a predefined threshold, the corresponding class label is presumably erroneous.

In a subsequent step, for each presumably erroneous class label, an estimated corrected class label is determined. According to a first option, the estimated corrected class label may be determined based on the model distribution of input data, for example of the input data of one or more training data sets. For example, starting from an outlier, the point of the model distribution of input data that is closest to the outlier may be determined, and for this point of the model distribution of input data, the corresponding class label may be taken as an estimated corrected class label.

According to a second option, in case the input data structure is a temporal sequence of elementary data structures, an estimated corrected class label may be determined based on the time progression of the class labels. For each elementary data structure of the temporal sequence, the random forest will yield a class label. By evaluating the time progression of these class labels, presumably erroneous class labels can be identified. Then, interpolation techniques like for example median filtering or moving averages may be applied to the time progression of the class labels, in order to determine an estimated corrected class label for each presumably erroneous class label.

According to a third option, an estimated corrected class label may be determined based on domain specific rules. These predefined rules may for example be configured both for detecting classifications that are not plausible or even impossible and for determining a class label that is plausible in the respective context.

According to a fourth option, a second machine-learning model may be used for determining an estimated corrected class label. For example, a neural network may be used for determining, for each presumably erroneous class label, a corresponding estimated corrected class label.

Next, the training state of the random forest is updated based on the one or more estimated corrected class labels, which indicate an estimated ground truth. For this purpose, one may replace at least one elementary decision tree of the random forest by at least one new decision tree or add at least one new decision tree to the random forest, wherein training of the at least one new decision tree is based on the estimated corrected class labels. Preferably, the other trees of the random forest remain unchanged. Thus, the training state of the random forest is updated by replacing or adding elementary decision trees.

Second Example: Neural network for analysing Image Data

In the following, an example of a system configured for predicting key points for a sequence of image frames will be described. The system is configured for acquiring a sequence of image frames showing a person performing physical exercises and for estimating the person's posture in each of the acquired frames. The system may for example comprise a neural network configured for predicting a set of body key points for each image frame, wherein the body key points may for example be assigned to the joints of the body and to body features like for example the forehead, the chin, the breast bone, the hip, etc.

Figure 2:
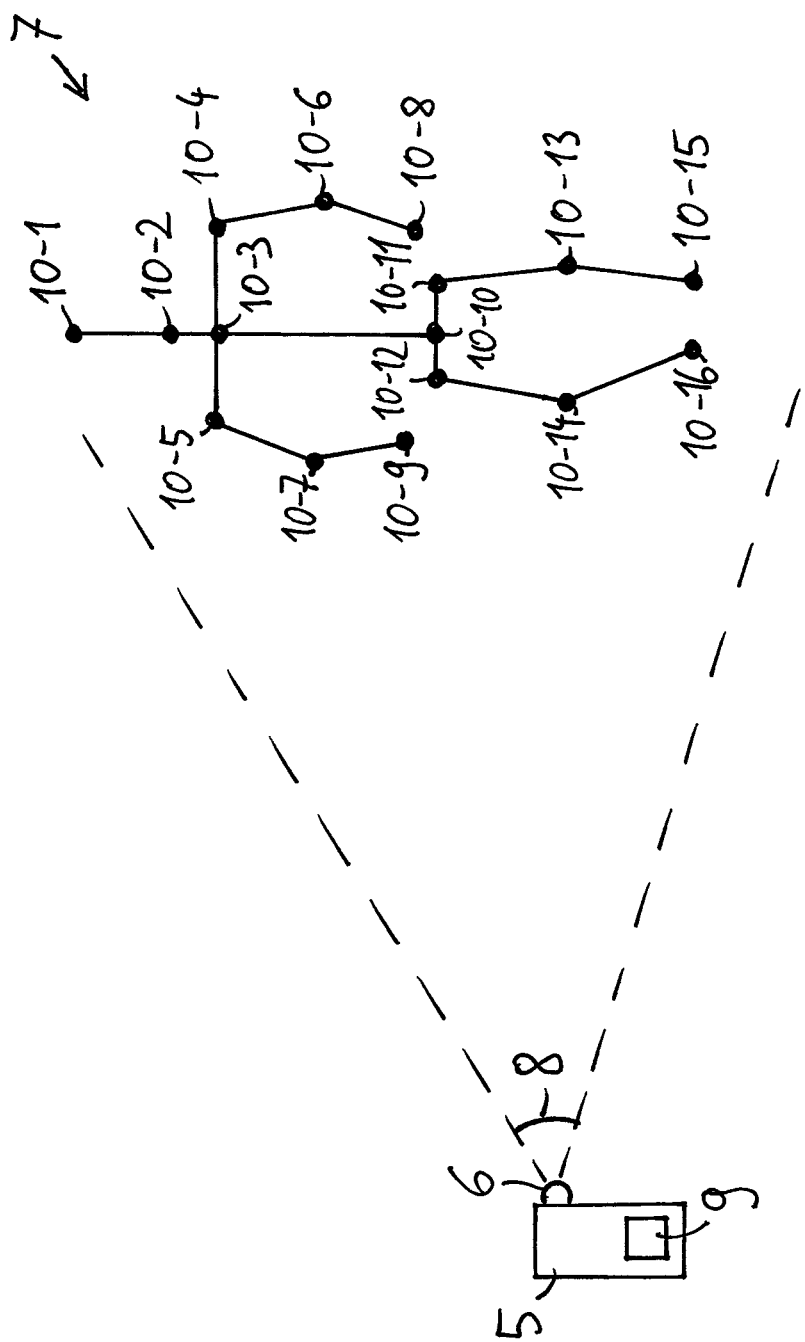
FIG. 2 shows a mobile device configured for predicting body key points indicating a person's posture for a sequence of image frames.

FIG. 2 shows a mobile device 5 with a camera 6, wherein the mobile device 5 is located at a distance from a person 7 performing physical exercises. The mobile device 5 may for example be a smartphone, a tablet, a laptop, etc. Preferably, the mobile device 5 is arranged such that the entire body of the person 7 is within the camera's field of view 8. In this position, the mobile device 5 can acquire a sequence of image frames, preferably a video sequence, of the person's movements.

On the mobile device 5, a neural network 9 may be implemented, the neural network 9 being configured for predicting, for each image frame, a set of body key points indicating the posture of the person's body. In the example shown in FIG. 2, the person's posture is described by the respective positions of 16 different body key points 10-1 to 10-16. The body key points 10-1 to 10-16 may for example be assigned to the joints of the body and to body features like for example the forehead, the chin, the breast bone, the hip, etc. The body key points 10-1 to 10-16 form a skeleton of the human body and allow for detecting the orientation of different parts of the body relative to each other. By tracking the positions of the body key points in the sequence of image frames, the person's movements when performing the physical exercise can be evaluated.

The camera 6 may for example be a 2D camera, a 2.5D camera or a 3D camera. The body key points 10-1 to 10-16 predicted for each image frame may for example be 2D points, 2.5D points or 3D points.

Preferably, the neural network 9 for processing the acquired image frames is implemented on the mobile device 5 itself. In an alternatively preferred embodiment, a stationary computer with a camera is used for acquiring the image frames and for processing the image data. In yet another preferred embodiment, the mobile device comprises a camera and a wireless interface configured for transmitting the image frames to a remote computer or to a cloud server. In this embodiment, the neural network for predicting key points based on the sequence of image frames is implemented on the remote computer or on the cloud server. In yet another preferred embodiment, a camera is coupled with a transmitter, with the transmitter being configured for transmitting the acquired image frames to a remote computer or to a cloud server for further processing.

Figure 3A:
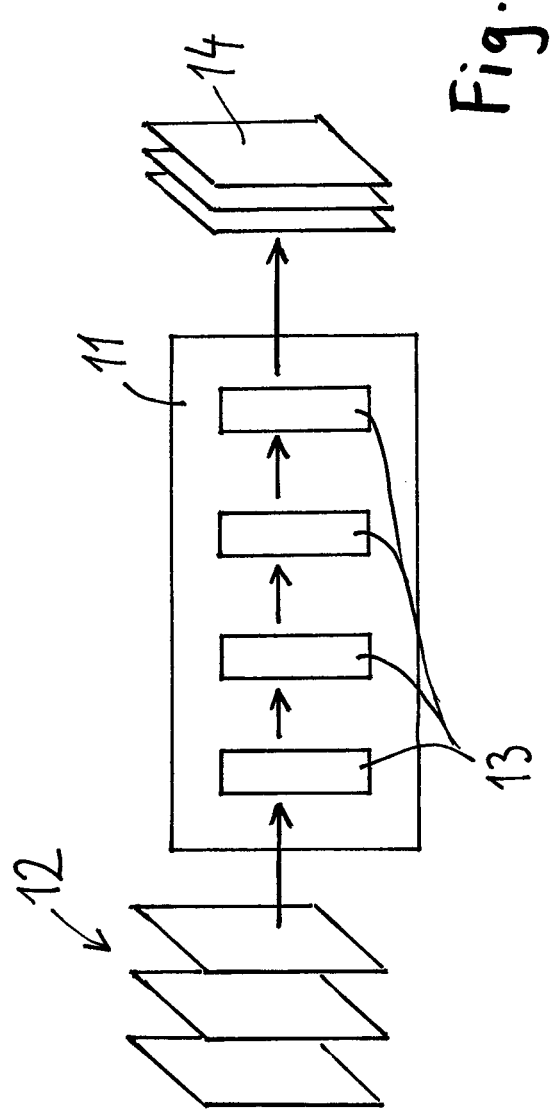
FIG. 3a shows a neural network configured for predicting predefined characteristics based on a sequence of image frames.

FIG. 3a shows, as an example implementation, a convolutional neural network 11 configured for identifying characteristics of a sequence of image frames 12. The image frames 12 may for example comprise two dimensional image data in three different colors represented as a 480×480×3 pixel data structure. The convolutional neural network 11 comprises a sequence of consecutive layers 13 configured for processing the image data, with the layers 13 comprising one or more of the following: at least one convolutional layer, at least one non-linear layer, at least one pooling layer, at least one classifier, at least one fully connected layer. For example, a neural network with a stacked hourglass architecture may be employed, as described in the article by A Newell, K Yang and J Deng "Stacked hourglass networks for human pose estimation", European Conference on Computer Vision, October 2016, pp 483-499, Springer International Publishing, https://arxiv.org/abs/1603.06937. For adapting the convolutional neural network to the limitations imposed by the processing resources on a smartphone, reference is made to the article by A G Howard, M Zhu, B Chen, D Kalenichenko, W Wang, T Weyand, M Andreetto and H Adam, "Mobilenets: Efficient convolutional neural networks for mobile vision applications", 2017, arXiv preprint arXiv:1704.04861, https://arxiv.org/abs/1704.04861. The neural network 11 may comprise at least one classifier at the neural network's back end, the at least one classifier being configured for providing the output data of the neural network 11. The at least one classifier may for example be implemented as a fully connected layer. The output of the neural network 11 may for example comprise a set of feature maps 14, with each of the feature maps 14 being related to a specific characteristic. For each of the specific characteristic to be detected, the neural network 11 provides a separate feature map indicating the probability, for each position, of the respective characteristic being located at that position. Hence, for detecting 16 body key points, the neural network 11 will provide a set of 16 feature maps per image frame. In this example, a data structure with 64×64×16 pixels may for example be obtained at the neural network's output.

Figure 3B:
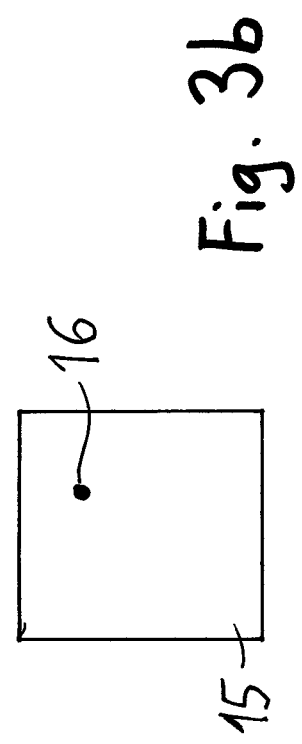
FIG. 3b shows a feature map indicating a position of a particular key point.

As shown in FIG. 3b, a feature map 15 is a two-dimensional matrix indicating respective probabilities for each position that the predefined characteristic is located at that position. The position with the highest probability is taken as the body key point's position 16. In addition, the probability associated with the body key point's position 16 indicates a confidence level that the respective characteristic is actually located at the respective position.

According to the method shown in FIG. 1, it is determined, for at least one of the key points predicted by the neural network, whether or not the respective key point is presumably erroneous. In case the respective key point is presumably erroneous, an estimated corrected key point will be determined.

Figure 4:
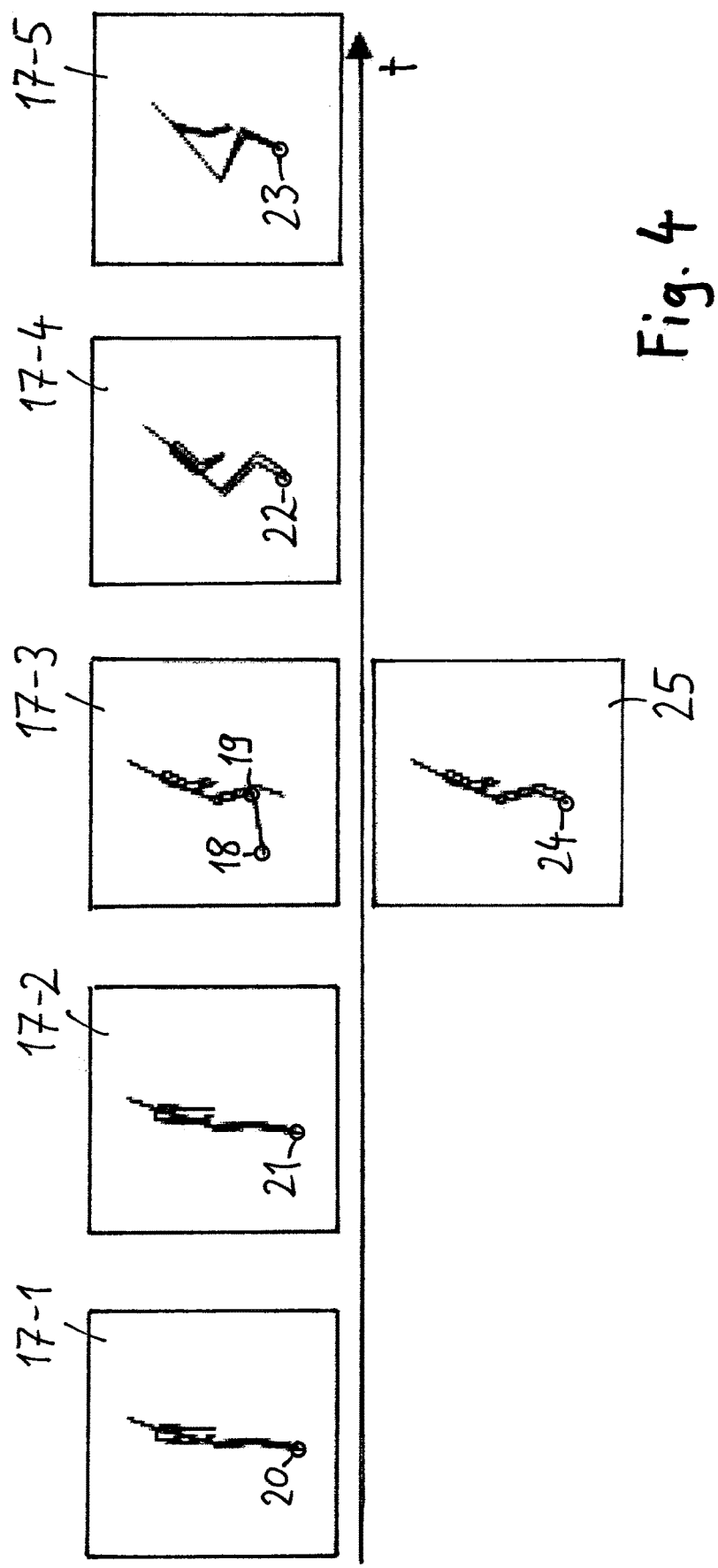
FIG. 4 shows a sequence of image frames, wherein the key point related to the ankle in the third image frame is presumably erroneous.

FIG. 4 depicts a sequence of five image frames 17-1 to 17-5 showing a person performing a physical exercise, for example a squat. In the third image frame 17-3, the key point 18 indicating the position of the ankle is presumably erroneous. This can for example be detected by evaluating the distance between the key point 18 corresponding to the ankle and the key point 19 corresponding to the knee, because this distance is not in agreement with the proportions of the human body. Hence, by applying at least one predefined criterion, it is detected that the key point 18 corresponding to the ankle is presumably erroneous. In a next step, for each key point that is presumably erroneous, an estimated corrected key point is determined. This may for example be done by determining the time progression of the key points 20, 21, 22, 23 corresponding to the ankle in the image frames 17-1, 17-2, 17-4, 17-5. For example, an estimated corrected key point 24 corresponding to the ankle can be obtained by performing an interpolation between the key point's position in the preceding image frames 17-1 and 17-2 and the key point's position in the subsequent image frames 17-4 and 17-5. As a result of this interpolation process, a corrected image frame 25 showing a corrected pose of the person is obtained, with the estimated corrected key point 24 indicating the correct position of the ankle. Alternatively, the estimated corrected key point may be determined by averaging the key points' positions in the neighbouring image frames 17-2 and 17-4.

In a next step, the corrected result can be used for improving the neural network's training state. In particular, the estimated corrected key point 24 can be used as a basis for fine-tuning the neural network. Thus, the training state of the neural network is selectively improved based on corrected results. The process of fine-tuning can be performed in the background during the neural network's regular operation.

In the following, different strategies for detecting presumably erroneous results and for correcting these results are discussed in more detail.

Identifying Key Points that are Presumably Erroneous

Determining whether or not a particular key point is erroneous may for example be based on one or more predefined criteria. Said criteria may comprise at least one of hand-engineered criteria and criteria obtained by deep learning techniques.

For example, a generative adversarial network (GAN) may be used for determining whether or not a particular key point is presumably erroneous. A generative adversarial network comprises two neural networks, a generator and a discriminator. The generator is trained to produce poses that are as close as possible to an original training data set. The discriminator is trained to distinguish these poses produced by the generator from those of the original training data set. In this regard, the discriminator can be used to determine whether a new pose is in the distribution or close to the distribution of the original data set or not. In case the discriminator determines that a new pose is not close to the distribution of the original data set, the pose is presumably erroneous.

A first option for evaluating a respective key point is to evaluate the key point's position relative to a predetermined model distribution of the key points. While for the random forest approach we look at the distribution of the input variables, here it makes sense to look at the distribution of the output values, i e of the key points predicted by the neural network. A respective key point's position is evaluated in relation to the model distribution of key points. The model distribution may for example be derived from a large quantity of predetermined data sets. For example, the model distribution may be obtained as an output of one or more training data sets.

For example, in case the neural network is used for evaluating poses, the key points extracted from the person's movement may for example be compared with a model distribution of body key points. This model data distribution of body key points represents a range of body movements when performing the exercise. The model distribution may relate to the entire set of key points or just to a subset of these key points, for example to the subset of key points related to the person's leg.

For evaluating a respective key point, the key point's position is evaluated in relation to the model distribution of key points. In particular, it is determined if the key point is close to the model distribution of key points, which represents the poses in the training data set. If the key point is not close to the distribution, the model has not seen the pose during training. Hence it makes sense to assume that the key point is presumably erroneous, to determine an estimated corrected key point and to include the estimated corrected key point in the update operation.

In particular, for evaluating whether or not a particular key point is presumably erroneous, a distance measure indicating a distance between the particular key point and the model distribution may for example be determined, and in case the distance measure exceeds a predefined threshold, the key point is presumably erroneous.

According to a second option, a time progression of key points corresponding to a particular landmark in the sequence of image frames may be used for identifying presumably erroneous key points. For example, it may be determined for a particular key point related to a specific landmark whether or not said key point fits into the time progression of key points indicating the position of the landmark.

In this regard, the time course of a key point related to a particular landmark may be described by means of a continuous curve, wherein this curve may for example be determined using exponential smoothing, moving averages, median filtering, Calman filtering, iteratively reweighted least squares regression, Savitzky-Golay filtering or a trend decomposition method like for example Seasonal and Trend Decomposition using Loess (STL). A trend decomposition method can be used for determining an underlying trend of the key points' time progression.

As soon as the curve describing the time progression of key points related to a specific landmark has been determined, the position of a particular key point corresponding to this landmark can be evaluated relative to this curve. For example, a distance measure indicating a distance between the respective key point and the curve may be determined. In case the distance measure exceeds a predefined threshold, the respective key point is presumably erroneous.

Evaluation of particular key points may further be based on determining optical flow of at least one key point in the sequence of image frames. Optical flow is obtained by projecting a vector field of velocities of the at least one key point onto an image plane. For determining whether or not a certain key point is presumably erroneous, the key point's position, velocity or motion may be evaluated relative to the optical flow. For example, it may be evaluated whether the key point's motion fits into the motion pattern described by the optical flow. For example, a deviation between the key point's position, velocity or motion relative to the optical flow may be determined, and in case this deviation exceeds a predefined level, the respective key point is presumably erroneous.

As a third option, the identification of presumably erroneous key points may be based on evaluating at least one predefined rule. These rules may for example be configured for determining if a certain key point is plausible in its respective context and for identifying outliers. These rules may for example relate to geometric constraints, positional constraints of at least one key point, like for example distance constraints of two key points relative to one another or angular constraints in a set of key points. For example, when evaluating postures of a human body, due to anatomic constraints, the distance between two body key points has to lie within a predefined range. Furthermore, joints only allow for limited angular movement. Further constraints may relate to upper limits for velocity and acceleration of the key points. Such constraints may be verified using at least one predefined rule, in order to identify key points that are presumably erroneous.

When attributing key points to landmarks in an image frame, errors may occur. Due to wrong matching, key points may be alternatingly attributed to different body characteristics in the sequence of image frames, and as a consequence, jittering occurs. For example, body key points related to the knee may be alternatingly attributed to the right leg and to the left leg of a person shown in the sequence of image frames. A specific rule may allow for detecting and correcting this kind of mismatch, and as a consequence, jittering can be prevented.

According to a fourth option, an additional machine learning model can be used for identifying key points that are presumably erroneous. For example, the machine learning model may be trained to identify specific types of errors like for example erroneously assigned key points and jittering.

According to a fifth option, a confidence level indicated in a feature map obtained at the neural network's output can be used for identifying key points that are presumably erroneous. In particular, in case the confidence level is below a predefined threshold, the corresponding key point is presumably erroneous. According to a further criterion, sudden changes of a key point's confidence level in a sequence of frames may indicate that a key point is presumably erroneous.

Determining Estimated Corrected Key Points

For each presumably erroneous key point identified in the last step, an estimated corrected key point may be determined. As a first option, an estimated corrected key point may for example be determined based on a model distribution of key points. For example, the point in the model distribution that is closest to the presumably erroneous key point may be determined. Then, the presumably erroneous data point may be replaced by the closest point in the distribution. In this example, this closest point in the model distribution is used as an estimated corrected key point.

As a second option, the estimated corrected key point is determined by applying interpolation techniques to at least some of the key points predicted for the image frames. For example, for determining the correct position of a presumably erroneous key point related to a particular characteristic, a time progression of key points related to the same characteristic in the sequence of image frames is determined, and from this time progression, the estimated corrected key point is derived. For determining the estimated corrected key point, filtering techniques like for example exponential smoothing, moving averages, median filtering, Caiman filtering, iteratively reweighted least squares regression, Savitzky-Golay filtering or a trend decomposition method like for example Seasonal and Trend Decomposition using Loess (STL) may for example be used. A trend decomposition method can be used for determining an underlying trend of the key points' time progression. For a presumably erroneous key point in a particular image frame, one or more image frames preceding the particular image frame and one or more image frames following the particular image frame can be taken as a basis for determining the estimated corrected key point. For example, for correcting a presumably erroneous key point in a particular image frame, image frames in a sub-interval preceding the particular image frame and in a sub-interval following the particular image frame may be taken as a basis for determining an estimated corrected key point.

According to a third option, for each presumably erroneous key point, an estimated corrected key point may be determined by applying at least one predefined rule. For example, the at least one predefined rule may be defined in a way that the estimated corrected key point is in agreement with predefined geometric properties. For example, in case a distance between two body key points indicating a posture of a person is determined as being too large or too small, an estimated corrected key point may be determined such that the distance between the respective body key points is in conformity with anatomic proportions. Similarly, in case an angle in a set of key points is not in agreement with anatomic constraints, the estimated corrected key point is chosen such that the respective angle conforms with anatomic properties. According to yet another example, in case that due to wrong matching, key points are alternatingly attributed to different landmarks, this mismatch may be corrected by applying a predefined rule configured for ensuring a consistent assignment of the predicted key points to respective landmarks.

According to a fourth option, for each presumably erroneous key point, an estimated corrected key point can be determined using a second machine learning model. For example, the second machine learning model may be more powerful than the first neural network, and for this reason, the second machine learning model may be capable of predicting key points with higher accuracy than the first neural network. In this regard, the second machine learning model is suited for determining an estimated corrected key point for each key point that is identified as being presumably erroneous. According to yet another example, the second machine learning model may be configured for detecting and correcting specific types of errors like for example erroneously assigned key points.

Fine-Tuning the Neural Network Based on the Estimated Corrected Key Points

In the next step, the at least one estimated corrected key point determined in the previous step is provided to a backpropagation method and based on the at least one estimated corrected key point, a step of fine-tuning the neural network's training state is performed.

Fine-tuning relates to a subsequent adjustment of a neural network's actual training state. The starting point for fine-tuning a neural network is a neural network that has been trained with a first data set A. In a subsequent step of fine-tuning the neural network, the neural network is further trained with a second data set B. The second data set B may for example be smaller than the first data set A. Both for initial training with data set A and for the fine-tuning with data set B, a backpropagation method is used for adjusting the neural network's parameters. In particular, the backpropagation method is used to determine how to adjust the parameters of the neural network in order to minimise the loss function.

Fine-tuning with a data set B is performed if data set A has a slightly different data distribution than the target distribution in a respective application or if certain outliers occur in the respective application, wherein said outliers have not been considered in the original generic data set A yet. Preferably, fine tuning may only be performed for a subset of the neural network's layers at the back end side of the neural network, whereas the layers at the neural network's front end are treated as "frozen layers". Further preferably, during a step of fine-tuning, the learning rate of the backpropagation method may be reduced relative to the learning rate used during a regular training process.

Figure 5:
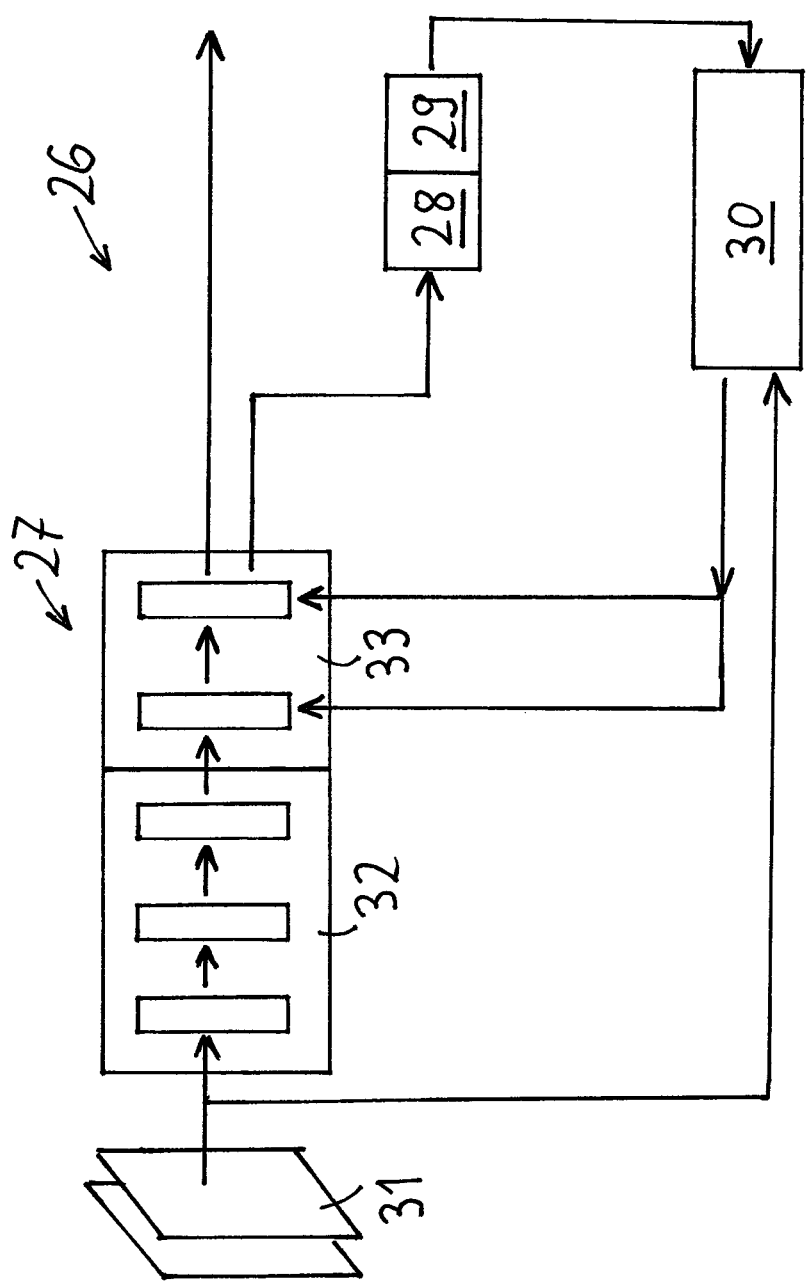
FIG. 5 shows a system configured for updating a training state of a neural network.

FIG. 5 shows a system 26 for identifying characteristics in a sequence of image frames, the system 26 being configured for updating a neural network's training state. The system 26 comprises a neural network 27, an erroneous result detecting unit 28, a correction unit 29 and a model update unit 30. A sequence of image frames 31 is provided as an input to the neural network 27. The neural network 27 may for example be a convolutional neural network (CNN) comprising a plurality of layers. The neural network 27 is configured for identifying characteristics for each image frame 31 of the sequence of image frames and for providing at its output at least one feature map indicating positions of predicted key points. The results obtained at the neural network's output are provided to the erroneous result detecting unit 28. The erroneous result detecting unit 28 is configured for determining, for at least one of the predicted key points, whether or not the respective key point is presumably erroneous, wherein one of the above described techniques for identifying presumably erroneous key points are used. The presumably erroneous key points detected by the erroneous result detecting unit 28 are forwarded to the correction unit 29, the correction unit 29 being configured for determining, for each of the presumably erroneous key points, an estimated corrected key point, wherein one of the above described techniques for determining estimated corrected key points are used.

The at least one estimated corrected key point determined by the correction unit 29 is forwarded to the model update unit 30. In addition, also the original sequence of image frames 31 is provided to the model update unit 30. The model update unit 30 is configured for performing a step of fine-tuning the neural network's training state based on the estimated corrected key points and on the original image frames 31. The model update unit 30 is configured for determining a loss function. A backpropagation method is performed for adjusting at least some of the neural network's parameters in a way that the loss function is minimised. In particular, the backpropagation method may comprise performing a stochastic gradient descent in order to minimise the loss function.

During the step of fine-tuning, layers in a first subset 32 of the neural network's layers may be treated as fixed layers, whereas layers in a second subset 33 of layers, in particular the layers at the neural network's back end, are treated as trainable layers. During the fine-tuning step, only the parameters of the trainable layers are adjusted. In an alternatively preferred embodiment, parameters of all the layers of the neural network 27 are adjusted. The learning rate during the step of fine-tuning may either correspond to the learning rate during a regular training step or the learning rate may be reduced relative to the regular learning rate, in order to accomplish a comparatively slow adjustment of the neural network's parameters.

As shown in FIG. 5, the fine-tuning performed by the model update unit 30 is performed in parallel with the neural network's regular operation. Especially in case time-series based interpolation techniques are applied, the estimated corrected key points may be determined with a time delay relative to the output of the neural network 27. For determining the estimated corrected key points, for example by means of interpolation, both key points of image frames preceding the image frame under consideration and key points of image frames following the image frame under consideration may be considered. For example, when determining a time propagation of the key points, a number of key points in the past and a number of key points in the future may be considered. The respective key points may for example be stored in a ring buffer or in a data array. As a consequence, there may be a predefined time delay of the fine-tuning steps relative to the steps of predicting the key points for the sequence of image frames 31.

The components of the system 26 shown in FIG. 5, in particular the neural network 27, the erroneous result detecting unit 28, the correction unit 29 and the model update unit 30 may be implemented on a mobile device such as a mobile phone, a laptop or a tablet. Thus, it is possible to permanently improve and adjust the training state of the neural network 27 on the mobile device itself. Alternatively, the components required for the model update may be installed on a remote computer, for example a stationary computer, or on a cloud server. In this case, it would be necessary to transmit the predicted key points from the mobile device to the remote computer and to transmit the results of the backpropagation method from the remote computer back to the mobile device.

The features described in the above description, claims and figures can be relevant to the invention in any combination. Their reference numerals in the claims have merely been introduced to facilitate reading of the claims. They are by no means meant to be limiting.

The invention claimed is:

1. A method for upgrading a training state of a machine learning model, the machine learning model being configured for supporting a model update, the method comprising:
   predicting a set of target data elements based on an input data structure using the machine learning model, wherein the input data structure is a temporal sequence of elementary data structures, with each elementary data structure corresponding to a certain point of time, and a target data element corresponds to a respective characteristic of the input data structure;
   for at least one of the predicted target data elements, each corresponding to a respective characteristic in an elementary data structure, determining whether or not a respective target data element is presumably erroneous based on an evaluation of a time progression of target data elements that correspond to the same characteristic in the temporal sequence of elementary data structures;
   for each presumably erroneous target data element detected in the previous step, determining an estimated corrected target data element; and
   based on at least one estimated corrected target data element, performing a step of updating the training state of the machine learning model.

2. The method of claim 1, further comprising:
   evaluating, for input data of the input data structure or for at least one target data element predicted based on the input data structure, a position of the input data or of the at least one target data element relative to a predetermined model distribution of the input data or of the set or a subset of target data elements or of parameters derived therefrom, and determining, based on the evaluation, whether or not one or more of the predicted target data elements are presumably erroneous.

3. The method of claim 1, further comprising:
   determining whether or not a target data element is presumably erroneous by evaluating at least one predefined rule.

4. The method of claim 1, further comprising:
   determining, for each presumably erroneous target data element, an estimated corrected target data element based on a model distribution of the input data or of the set or a subset of target data elements or of parameters derived therefrom.

5. The method of claim 1, further comprising:
   determining, for each presumably erroneous target data element, an estimated corrected target data element by applying interpolation techniques to at least some of the target data elements predicted based on the input data structure.

6. The method of claim 1, further comprising:
   determining, for each presumably erroneous target data element, an estimated corrected target data element by applying at least one predefined rule for determining the estimated corrected target data element.

7. A method for upgrading a training state of a machine learning model, the machine learning model being configured for supporting a model update, the method comprising:
   predicting a set of target data elements based on an input data structure using the machine learning model, wherein the input data structure is a temporal sequence of elementary data structures, with each elementary data structure corresponding to a certain point of time, wherein the target data elements are predicted by the machine learning model based on the elementary data structures in real time, and wherein a target data element corresponds to a respective characteristic of the input data structure;

for at least one of the predicted target data elements, determining whether or not a respective target data element is presumably erroneous;

for each presumably erroneous target data element detected in the previous step, determining an estimated corrected target data element, wherein the at least one estimated corrected target data element is output with a predetermined time delay relative to the predicted target data elements; and based on at least one estimated corrected target data element, updating the training state of the machine learning model.

8. The method of claim 1, wherein the input data structure is an image data structure or a sequence of image data structures and wherein the target data elements are key points predicted for an image data structure, a key point indicating a respective position of a landmark in the image data structure.

9. The method of claim 1, further comprising:
performing a backpropagation method based on the at least one estimated corrected target data element.

10. The method of claim 9, wherein the input data structure is an image data structure or in a sequence of image data structures,
and wherein the target data elements are key points predicted or for an image data structure, a key point indicating a respective position of a landmark in the image data structure.

11. A system comprising:
a camera configured to capture an image;
a memory including a machine learning model configured to support a model update, and to predict a set of target data elements in the captured image based on an input data structure, wherein the input data structure is a temporal sequence of elementary data structures, with each elementary data structure corresponding to a certain point of time, and a target data element corresponds to a respective characteristic of the input data structure; and
a processor configured to:
receive predicted target data elements from the machine data learning model,
determine, for at least one of the predicted target data elements, each corresponding to a respective characteristic in an elementary data structure, whether or not a respective target data element is presumably erroneous based on an evaluation of a time progression of target data elements that correspond to the same characteristic in the temporal sequence of elementary data structures,
determine, for each presumably erroneous target data element, an estimated corrected target data element, and
update a training state of the machine learning model based on the at least one estimated corrected target data element.

12. The system of claim 11, wherein the processor is further configured to:
generate, for each presumably erroneous target data element, an estimated corrected target data element by applying interpolation techniques to at least some of the target data elements predicted based on the input data structure, or by applying at least one predefined rule for determining the estimated corrected target data element, or by using a second machine learning model for determining the estimated corrected target data element.

13. A mobile device, comprising a system according to claim 11.

14. A computer program product stored on a non-transitory computer-readable recording medium, which when executed by a mobile device or a computer including a processor and a memory, cause the mobile device or the computer to perform the method according to claim 1.

15. A computer program product stored on a non-transitory computer-readable recording medium, which when executed by a mobile device or a computer including a processor and a memory, cause the mobile device or the computer to perform the method according to claim 7.

16. A system comprising:
a camera configured to capture an image;
a memory including a machine learning model configured to support a model update, and to predict a set of target data elements in the captured image based on an input data structure, wherein the input data structure is a temporal sequence of elementary data structures, with each elementary data structure corresponding to a certain point of time, and a target data element corresponds to a respective characteristic of the input data structure; and
a processor configured to:
receive predicted target data elements,
determine, for at least one of the predicted target data elements, whether or not a respective target data element is presumably erroneous,
receive presumably erroneous target data elements,
determine, for each presumably erroneous target data element detected in the previous step, an estimated corrected target data element, wherein the at least one estimated corrected target data element is output with a predetermined time delay relative to the predicted target data elements, and
update a training state of the machine learning model based on the at least one estimated corrected target data element.

17. The system of claim 16, wherein the processor is further configured to:
generate, for each presumably erroneous target data element, an estimated corrected target data element by applying interpolation techniques to at least some of the target data elements predicted based on the input data structure, or by applying at least one predefined rule for determining the estimated corrected target data element, or by using a second machine learning model for determining the estimated corrected target data element.

* * * * *